(12) United States Patent
Mildh

(10) Patent No.: US 8,442,233 B2
(45) Date of Patent: May 14, 2013

(54) TELECOMMUNICATION SYSTEMS AND ENCRYPTION OF CONTROL MESSAGES IN SUCH SYSTEMS

(75) Inventor: Gunnar Mildh, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 764 days.

(21) Appl. No.: 12/513,312

(22) PCT Filed: Oct. 31, 2007

(86) PCT No.: PCT/SE2007/050803
§ 371 (c)(1),
(2), (4) Date: Feb. 11, 2010

(87) PCT Pub. No.: WO2008/054320
PCT Pub. Date: May 8, 2008

(65) Prior Publication Data
US 2010/0177897 A1 Jul. 15, 2010

(30) Foreign Application Priority Data
Nov. 1, 2006 (SE) ........................................ 0602317

(51) Int. Cl.
*H04L 9/00* (2006.01)
*H04K 1/00* (2006.01)
*H04W 36/00* (2009.01)

(52) U.S. Cl.
USPC .......................................... 380/272; 455/436

(58) Field of Classification Search ........................ None
See application file for complete search history.

(56) References Cited

U.S. PATENT DOCUMENTS

| | | | |
|---|---|---|---|
| 6,466,556 B1 * | 10/2002 | Boudreaux | 370/331 |
| 7,020,455 B2 * | 3/2006 | Krishnarajah et al. | 455/410 |
| 7,474,751 B2 * | 1/2009 | Zheng | 380/270 |
| 7,817,595 B2 * | 10/2010 | Wu | 370/328 |
| 7,826,617 B2 * | 11/2010 | Funnell et al. | 380/273 |
| 7,889,867 B2 * | 2/2011 | Yi et al. | 380/262 |
| 7,945,051 B2 * | 5/2011 | Yi | 380/270 |
| 7,949,012 B2 * | 5/2011 | Chang et al. | 370/474 |
| 8,144,877 B2 * | 3/2012 | Yang et al. | 380/278 |
| 8,275,114 B2 * | 9/2012 | Jiang | 379/251 |
| 2006/0094408 A1 * | 5/2006 | Hu et al. | 455/414.1 |
| 2007/0070972 A1 * | 3/2007 | Wang et al. | 370/349 |
| 2007/0265875 A1 * | 11/2007 | Jiang et al. | 705/1 |
| 2007/0297369 A1 * | 12/2007 | Jiang et al. | 370/331 |
| 2008/0037548 A1 * | 2/2008 | Yi et al. | 370/394 |
| 2008/0184032 A1 * | 7/2008 | Li et al. | 713/171 |
| 2008/0188200 A1 * | 8/2008 | Forsberg | 455/410 |
| 2008/0267405 A1 * | 10/2008 | Vialen et al. | 380/270 |
| 2009/0275309 A1 * | 11/2009 | He | 455/410 |
| 2010/0002883 A1 * | 1/2010 | Sammour et al. | 380/272 |
| 2010/0056156 A1 * | 3/2010 | Xu et al. | 455/436 |
| 2010/0178923 A1 * | 7/2010 | Yi et al. | 455/436 |

(Continued)

*Primary Examiner* — Christopher Revak

(57) ABSTRACT

The present invention relates to a solution for handling encryption of control messages in a wireless telecommunications network. Key generation is based on sequence numbers and the present invention reduces access to core network devices for updating sequence numbers relating to network events by separating sequence number generation to different parts of the network and different types of network events. This is done by providing a solution where sequence number rollover events and handover events are separated from each other in providing input to radio resource control message encryption. Three different counters may be used for different types of events and all three may be used as input to an encryption algorithm.

15 Claims, 5 Drawing Sheets

U.S. PATENT DOCUMENTS

| | | | |
|---|---|---|---|
| 2010/0260096 A1* | 10/2010 | Ulupinar et al. | 370/315 |
| 2011/0123029 A1* | 5/2011 | Zhang et al. | 380/272 |
| 2011/0250889 A1* | 10/2011 | Hapsari et al. | 455/436 |
| 2011/0269464 A1* | 11/2011 | Xu et al. | 455/436 |
| 2012/0033815 A1* | 2/2012 | Kuo | 380/272 |
| 2012/0047367 A1* | 2/2012 | Han et al. | 713/171 |
| 2012/0099525 A1* | 4/2012 | Maheshwari | 370/328 |
| 2012/0142361 A1* | 6/2012 | Zhao et al. | 455/446 |
| 2012/0218973 A1* | 8/2012 | Du et al. | 370/331 |
| 2012/0308007 A1* | 12/2012 | Li et al. | 380/270 |

* cited by examiner

TELECOMMUNICATION SYSTEMS AND ENCRYPTION OF CONTROL MESSAGES IN SUCH SYSTEMS

TECHNICAL FIELD

The present invention relates to telecommunication systems and encryption of control messages in such systems. Particular aspects of the invention relate to wireless telecommunication systems.

BACKGROUND OF THE INVENTION

Today a vast spectrum of different telecommunication systems has evolved for both wired and wireless telecommunication. Telecommunication systems have e.g. been standardized in connection with the so-called second generation (2G) and third generation (3G) mobile phone systems. Information about 3G-technology (e.g. W-CDMA or CDMA2000) and 2G-technology (e.g. GSM) etc. can e.g. be found in specifications from the 3$^{rd}$ Generation Partnership Project (3GPP), see e.g. the web-site at www.3gpp.org.

Further development has produced techniques for enabling even higher data transfer speeds. One such example is the ongoing development of the SAE/LTE (System Architecture Evolution/Long Term Evolution), which is the next step in terms of user-service experience, improving latency, capacity and throughput. For example, this includes the 3GPP work on the Evolution of the 3G Mobile Systems and hence the evolution of the Universal Terrestrial Radio Access Network (UTRAN).

As can be seen in FIG. 1, the evolved UTRAN comprises eNBs (eNode B) 1, providing the evolved UTRA User-plane (U-plane) and Control-plane (C-plane) protocol terminations towards the User Equipment (UE). The eNBs are interconnected with each other by means of a X2 interface 9. It is assumed that there always exist an X2 interface between the eNBs that need to communicate with each other, e.g. for support of handover of UEs in LTE_ACTIVE. The eNBs are also connected by means of the S1 12 interface to the EPC (Evolved Packet Core). The S1 interface supports a many-to-many relation between aGWs (Access Gateways) and eNBs.

The eNB host various functions for Radio Resource Management: Radio Bearer Control, Radio Admission Control, Connection Mobility Control, Dynamic Resource Allocation (scheduling), and so on as understood by the skilled person.

Mobility Management entity (MME) hosts various functions for distribution of paging messages to the eNBs.

User Plane Entity (UPE) hosts various functions for:
 IP Header Compression and encryption of user data streams;
 Termination of U-plane packets for paging reasons;
 Switching of U-plane for support of UE mobility.

Additional information can e.g. be found in the specification "3GPP TR 25.912 V7.1.0 (2006 September)" and in other specifications from the 3GPP associated therewith.

In this connection it has been agreed that Radio Resource Control (RRC) messages, exchanged between the eNode B and terminal (UE), should be ciphered and integrity protected. This requires that RRC keys are used in the eNode B and UE to perform the security functions. The RRC keys are generated in the Core Network (CN) and UE and are sent down from the CN to eNode B when the UE enters active state. The RRC keys are also sent between the eNode Bs during active mode intra-LTE mobility. The RRC is part of a sub layer of Layer 3 on the radio interface; it exists in the control plane only and provides information transfer service to the NAS (Non Access Stratum). RRC is responsible for controlling the configuration of radio interface Layers 1 and 2. The Non Access Stratum is a functional layer running and supporting traffic and signalling between the UE (User Equipment) and the CN (Core Network).

The ciphering and integrity protection algorithm requires a unique sequence number as input for each RRC message. The same sequence number and RRC key should never be used twice; however the same sequence number can be used as input to both the ciphering and the integrity protection.

Parts of the sequence number will be sent over the radio interface with every RRC message in order to key the sequence number synchronized in the sender and receiver, however in order to limit the number of bits sent over the radio interface it is possible to use a hyper frame number (HFN) (i.e. an overflow counter mechanism) which is not transferred over the radio but is maintained internally in the eNode B and terminal (UE). The HFN will also be used as input to the ciphering and integrity protection algorithm. The HFN will be a counter with enough number of bits so that the sequence number used as input to the ciphering and integrity protection algorithm will be unique within the life time of the RRC key.

The RRC key is generated during Network Attach or other core network procedure, by the Authentication and Key Agreement algorithm (AKA), which involves the (U)SIM card in the terminal and the HLR/HSS and other core network nodes.

This process is time consuming and it would be beneficial not to need to re-generate the RRC key after different mobility events such as handover and Idle to Active state transitions.

One state of the art solution used to be able to maintain RRC security during mobility events exists in the WCDMA/UMTS standard. This solution is based on;
a) Maintaining a START value in the UE/USIM which is used to initiate the HFN counter after an Idle to Active state transition. The START value is transferred to UTRAN during RRC connection setup. The HFN is always initiated to a value that is higher than the previously used SFN in order to avoid using the same HFN with the same RRC key.
b) During inter-RNC handovers the HFN is transferred to the target RNC, the HFN is also normally incremented by one or two steps during handover in order to avoid that the same HFN is re-used for the same RRC keys. This is due to that during the handover process the HFN could be incremented in the source RNC while the resources are being prepared in the target RNC.

This solution is however fairly complex and requires additional security related signaling. One particular problem with the current solutions is that the HFN are used for multiple things, both as an overflow counter for the shorter sequence number used over the radio, but it is also incremented during mobility events such as handovers and idle to active state transitions.

For SAE/LTE which have a slightly different functional division between the core network and radio network (e.g. there are no RNCs) and for other standardised telecommunication networks having the same or similar abilities it is beneficial to utilize a different method.

SUMMARY OF THE INVENTION

The basic concept of the invention is to separate the sequence number overflow counter from the counters for mobility events and to use all counters as separate input to RRC ciphering and integrity protection algorithm. The different counters would be maintained in the UE, eNode B and CN, and will be synchronized implicitly due to different events.

Example of events could be that the short sequence number used over the radio rolls over, or that a handover has been performed, or that an idle to active state transitions has been performed.

The counters would be hierarchical, i.e. when the state transition counter (maintained in the UE and core network) is incremented the handover and overflow counters (maintained in the UE and eNode B) are re-set to zero, and when the handover counter is incremented the overflow counter is re-set to zero.

The benefits with this approach are that the RRC message sequence numbers can always be set to zero after a handover or state transition, and there is no need to signal any start values over the radio as long as the UE and CN keeps track of the state transition counter (IDLE/ACTIVE) and the UE and the RAN keeps track of the handover counter (ACTIVE).

To put the above in slightly different words: It would be beneficial to have a solution in LTE which is separating the Sequence Number Rollover Events from Mobility Events (handovers, state transitions). A solution could be envisioned where there are 3 different counters which provide input to the RRC security. One overflow counter for the sequence number, one handover counter and one state transition counter. The counters would be hierarchical, i.e. when the state transition counter is incremented the handover and overflow counters are re-set to zero, and when the handover counter is incremented the overflow counter is re-set to zero.

If it is desired to avoid additional counters in the RRC ciphering/integrity protection algorithm it would be possible to realize the effect of the state transition and handover counter by instead performing a crypto graphical function in the CN/UE on the RRC key at every state transition and then perform a different function in the RAN/UE on every handover. In such way the RRC key would be new at every mobility event making it possible to re-set the overflow counter (HFN) to zero. An added benefit of this approach would be to make it difficult to trace back to the original RRC key if a subsequent RRC key gets compromised (assuming a secure enough "function" is used).

The above is accomplished according to a first aspect of the invention which provides a method for encrypting RRC messages exchanged between a node (eNB) and a user equipment (UE) in a telecommunication system by using RRC keys for encryption of RRC messages, comprising the step of separating sequence number rollover events from mobility events in the process of encryption of RRC messages.

The method is further characterised by the steps of:
utilizing three different counters, which counters are hierarchical, such that when the first counter is incremented due to the occurrence of a first group of events the second and third counters are re-set to zero, and when the second counter is incremented due to a second group of events the third counter is re-set to zero,
providing the output from said counters as input to an encryption algorithm for encryption of the RRC keys.

A second aspect of the present invention comprising the features of the first aspect is characterised in that said first counter is a state transition counter, the second counter is a handover counter and the third counter is an overflow counter for the sequence number.

The method according to the first aspect wherein the step of separating may comprise the steps of:
performing encryption of control messages related to state transitions in user equipment and a core network;
performing encryption of control messages related to handover events in the user equipment and in a radio access network part of the communications network,
wherein the two encryption processes are separate from each other.

Furthermore, RRC keys may be provided in a crypto algorithm.

The above is also accomplished according to a third aspect of the invention which provides a user equipment (UE) arranged to operatively exchange encrypted RRC messages with a node (eNB) in a telecommunication network by using the method of the first aspect of the present invention.

The user equipment is characterised in that it is:
provided with access to three different counters, which counters are hierarchical, such that when the first counter is incremented due to the occurrence of a first group of events the second and third counters are re-set to zero, and when the second counter is incremented due to a second group of events the third counter is re-set to zero,
arranged to operatively provide the output from said counters as input to a crypto algorithm for encryption of the RRC messages.

A fourth aspect of the present invention comprising the features of the third aspect is characterised in that said first counter is a state transition counter, the second counter is a handover counter and the third counter is an overflow counter for the sequence number.

A fifth aspect of the present invention is provided comprising a communication device in an infrastructure part of a wireless communication network, comprising a processing unit, a memory unit, and at least one communication interface, wherein the processing unit is arranged to maintain at least one counter stored in the memory unit for use in securing radio resource control messages, i.e. RRC, characterized in that the device is further arranged to separate sequence number rollover events from mobility events in the process of encryption of RRC messages for instance by obtaining three separated counters which are used in a hierarchical manner such that when the first counter is incremented due to the occurrence of a first group of events the second and third counters are re-set to zero, and when the second counter is incremented due to a second group of events the third counter is re-set to zero; the communication device is arranged to operatively provide the output from said counters as input to a crypto algorithm for encryption of RRC messages.

A sixth aspect of the present invention is provided in a system for handling communication in a wireless telecommunications network, comprising:
an access gateway (eNodeB);
a core network;
wherein the access gateway is arranged to communicate with a user equipment and the core network and wherein the access gateway is arranged to separate sequence number rollover events from mobility events in the process of encryption of RRC messages, for instance by accessing three different counters, which counters are hierarchical, such that when the first counter is incremented due to the occurrence of a first group of events the second and third counters are re-set to zero, and when the second counter is incremented due to a second group of events the third counter is re-set to zero, and wherein each of the core network and access gateway are arranged to use the counters for producing radio resource control keys used in a crypto algorithm.

A seventh aspect of the present invention is provided in a computer program stored in a computer readable medium for use in a device part of a wireless telecommunication network, comprising instruction sets for:
- encrypting radio resource control messages (RRC), using encryption RRC keys, between user equipment, access gateway, and core network devices;
- utilizing three different counters, which counters are hierarchical, such that when the first counter is incremented due to the occurrence of a first group of events the second and third counters are re-set to zero, and when the second counter is incremented due to a second group of events the third counter is re-set to zero, providing the output from said counters as input to a crypto algorithm for producing said RRC keys; and
- optionally exchanging counter values with other devices in the communication network.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION

Figure 1:
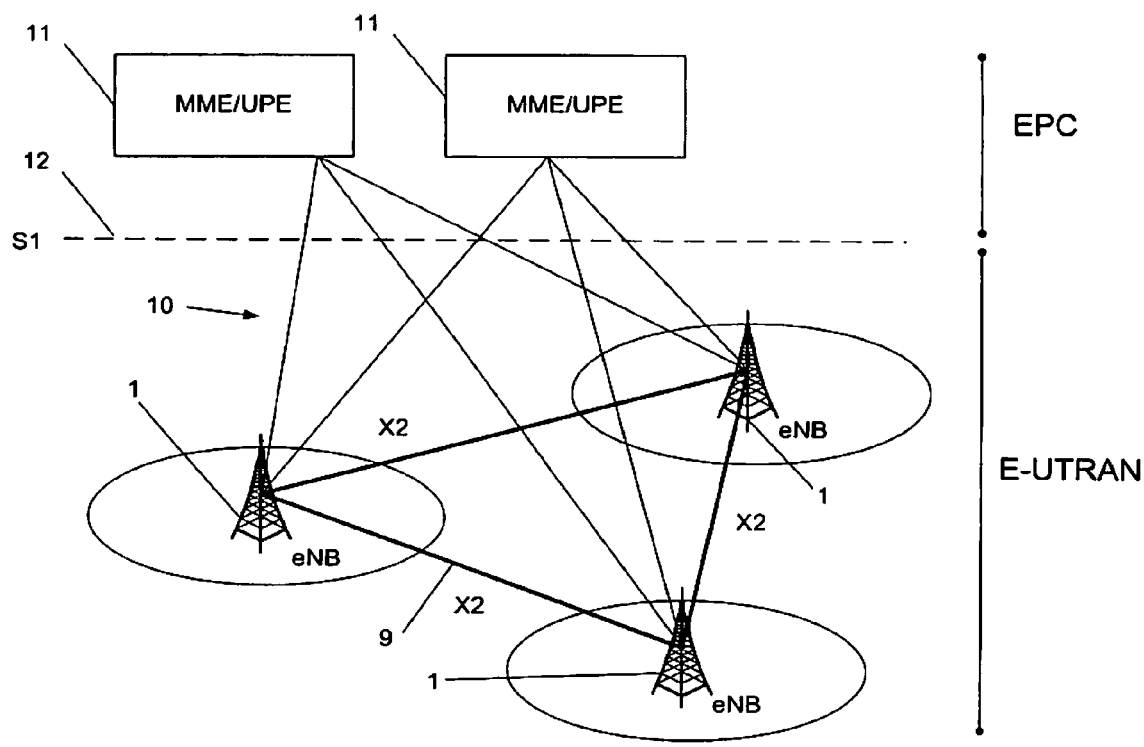
FIG. 1 illustrates schematically a network according to the present invention.

In FIG. 1 reference numeral 10 generally indicates a network according to the present invention, the evolved UTRAN comprises eNBs (eNode B) 1, providing the evolved UTRA User-plane (U-plane) and Control-plane (C-plane) protocol terminations towards the User Equipment (UE). The eNBs are interconnected with each other by means of an X2 interface 9. It is assumed that there always exist an X2 interface between the eNBs that need to communicate with each other, e.g. for support of handover of UEs in LTE_ACTIVE. The eNBs are also connected by means of the S1 interface 12 to the EPC (Evolved Packet Core). The S1 interface supports a many-to-many relation between aGWs (Access Gateways) and eNBs. It should be noted that other interfaces may be used for the communication between the eNBs other than the X2 interface.

The eNB host various functions for Radio Resource Management: Radio Bearer Control, Radio Admission Control, Connection Mobility Control, Dynamic Resource Allocation (scheduling), and so on as understood by the skilled person.

Mobility Management entity (MME) 11 hosts various functions for distribution of paging messages to the eNBs.

Figure 2:
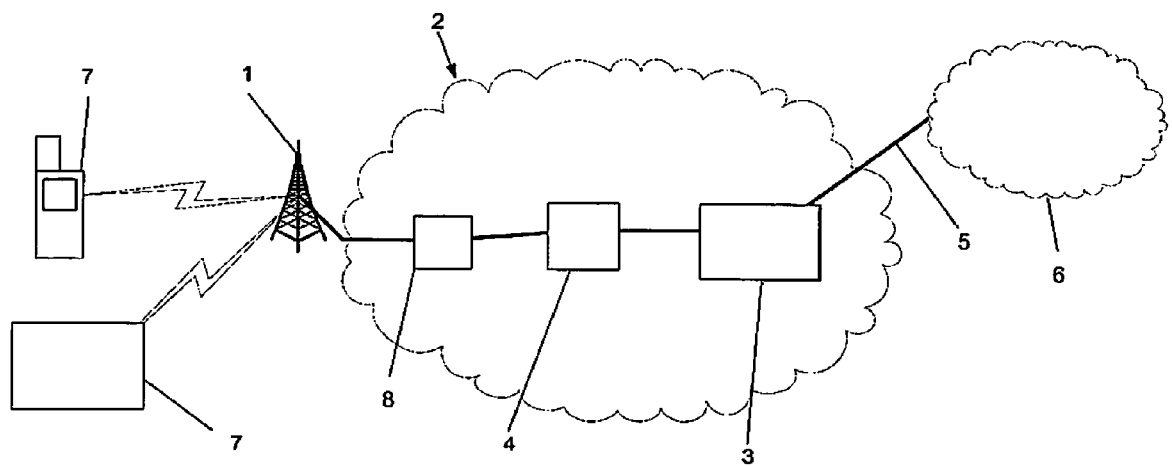
FIG. 2 illustrates schematically the network according to FIG. 1 in a different view.

FIG. 2 shows the network from FIG. 1 in more detail comprising at least one wireless infrastructure access gateway device 1 (eNodeB), an infrastructure communication core network 2 (CN) comprising for instance a network gateway node 3 (e.g. GGSN), a network serving node 4 (e.g. SGSN), and an access connection 5 to a communication network 6 (e.g. telephony network or a data network; e.g. Internet). User equipment devices (UE) 7 may connect to the wireless access gateway through some suitable wireless communication protocol (to be discussed further below). The infrastructure network may comprise other components as well (all not shown in FIG. 2), such as MSC (Mobile Switching Centre) 8, VLR (visitor Location Register), or HLR (Home Location Register) depending on configuration as understood by the person skilled in the art.

For security reasons ciphering of messages in Radio Resource Control (RRC) functionality are implemented within the network at different entities of the network, including the UEs. Ciphering of messages are done using crypto graphical techniques wherein seeds are used for generating input to algorithms. The seed are produced using different kinds of sequence numbers, optionally together with other information (e.g. HFN number), which should not be repeated in order to reduce the risk of being compromised or at least not repeated within a reasonable time period.

The following assumptions are made regarding the RRC security:
1. The RRC keys are cryptographically separated from the CN keys used for NAS (Non access stratum) and end user data protection.
2. The RRC keys are either generated directly by a NAS (CN/UE) level AKA procedure, or derived in the CN/UE from key material that was generated by a NAS (CN/UE) level AKA procedure.
3. The RRC keys are sent from the CN to the eNode B when the UE is entering LTE_ACTIVE state (i.e. during RRC connection or S1 context setup)
4. The RRC keys are sent between the eNode Bs during active mode intra-LTE mobility.
5. A sequence number will be used as input to the ciphering and integrity protection of RRC. A given sequence number should only be used once for a given RRC key (except for identical re-transmission). The same sequence number can be used for both ciphering and integrity protection.
6. A hyper frame number (HFN) (i.e. an overflow counter (OC) mechanism) is used in the eNode B in order to limit the actual number of sequence number bits that is needed to be sent over the radio with each RRC message.

The basic concept of the invention is to separate the sequence number overflow counter from the counters for mobility events and to use all counters as separate input to RRC ciphering and integrity protection algorithm. The different counters would be maintained in the UE, eNode B and CN, and will be synchronized implicitly due to different events.

Example of events could be that the short sequence number used over the radio rolls over, or that a handover has been performed, or that an idle to active state transitions has been performed.

The counters may be hierarchical, i.e. when the state transition counter (maintained in the UE and core network) is incremented the handover and overflow counters (maintained in the UE and eNode B) are re-set to zero, and when the handover counter is incremented the overflow counter is re-set to zero.

The benefits with this approach are that the RRC message sequence numbers can always be set to zero after a handover or state transition, and there is no need to signal any start values over the radio as long as the UE and CN keeps track of the state transition counter (IDLE/ACTIVE) and the UE and the RAN keeps track of the handover counter (ACTIVE).

To put the above in slightly different words: It is beneficial to have a solution in LTE which is separating the Sequence Number Rollover Events from Mobility Events (handovers, state transitions). A solution could be envisioned where there are 3 different counters which provide input to the RRC security. One overflow counter for the sequence number, one handover counter and one state transition counter. The counters may be hierarchical, i.e. when the state transition counter is incremented the handover and overflow counters are re-set to zero, and when the handover counter is incremented the overflow counter is re-set to zero.

If it is desired to avoid additional counters in the RRC ciphering/integrity protection algorithm it would be possible to realize the effect of the state transition and handover counter by instead performing a crypto graphical function in the CN/UE on the RRC key at every state transition and then perform a different function in the RAN/UE on every handover. In such way the RRC key would be new at every mobility event making it possible to re-set the overflow counter (HFN) to zero. An added benefit of this approach would be to make it difficult to trace back to the original RRC key if a subsequent RRC key gets compromised (assuming a secure enough "function" is used).

Figure 3:
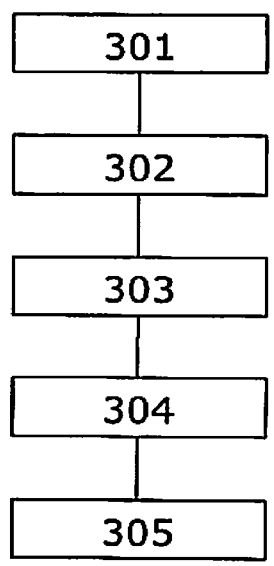
FIG. 3 illustrates schematically in a block diagram a method according to the present invention.

FIG. 3 shows a method according to the present invention:
301. maintaining up to three counters related to different network or management events as discussed above;
302. detecting network events
303. determining type of network event.
304. using counter values as input in an algorithm for encrypting radio control messages.
305. optionally synchronizing counter values between different network entities using either a timely manner (i.e. on a regular basis) or in an opportunistic manner (i.e. using other control messages to distribute values when available)

Figure 4:
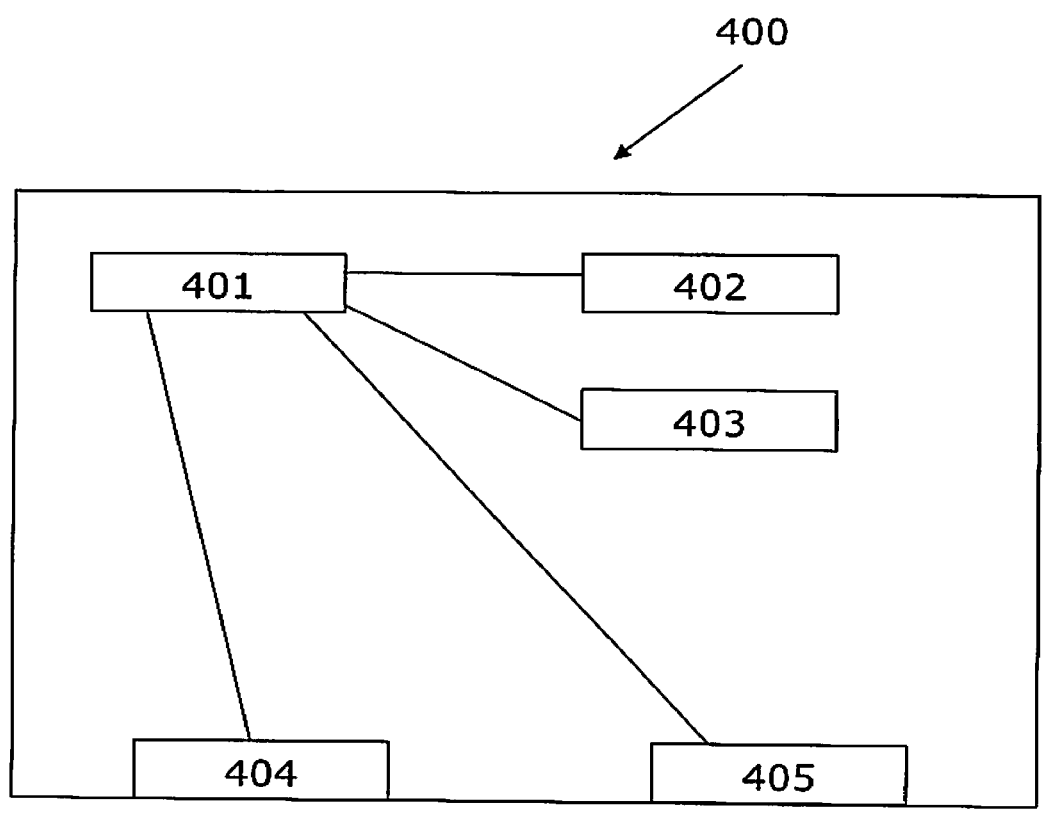
FIG. 4 illustrates schematically in a block diagram an infrastructure device according to the present invention.

The present invention is utilized in the eNodeBs, the core network, and in the UE as discussed above. In the infrastructure network the eNodeB is responsible for maintaining handover and overflow counters. As shown in FIG. 4 an eNodeB 400 may comprise at least one processing unit 4001, at least one memory unit 402 (volatile and/or non-volatile), optionally a control interface unit 403, at least one infrastructure network communication interface 404, and at least one wireless network interface 405. The eNodeB should be seen as a logical entity comprising several blocks of functions such as logical attachment functions for handling connection and communication between UEs and the eNodeB, physical radio interface functions, and infrastructure communication functions for handling communication between the core network and the eNodeB. However, it should be understood by the skilled person that part of these functional blocks may reside in separate devices together forming the eNodeB. The memory unit 402 may comprise any suitable type, such as RAM, DRAM, ROM, EEPROM, Flash, hard disk and so on as understood by the skilled person. The radio interface may use any suitable radio protocol as understood by the skilled person, either a fixed protocol, combination of fixed protocols, or software defined radio solution. The processing unit may for instance comprise at least one of a microprocessor, FPGA (Field programmable gate array), digital signal processor (DSP), or ASIC (application specific integrated circuit).

Figure 5:
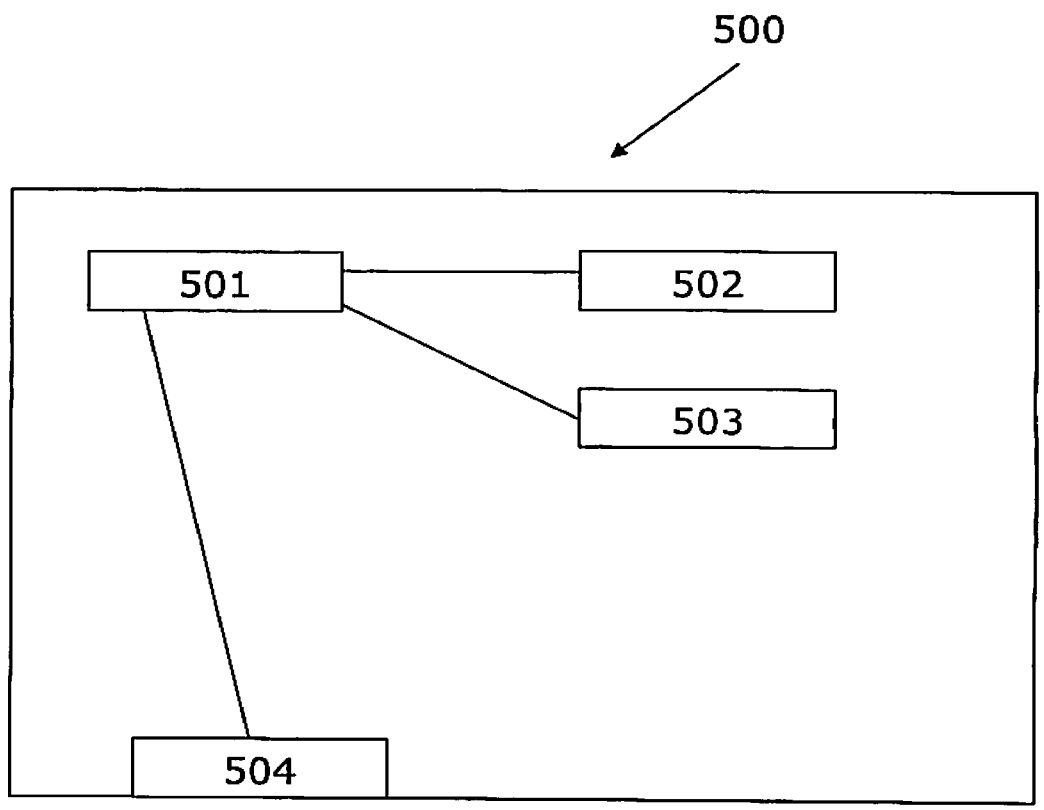
FIG. 5 illustrates schematically in a block diagram a user device according to the present invention

As seen in FIG. 5, the UE 500 may comprise at least one processing unit 501, a user interface unit 502, at least one memory unit 503 (volatile and/or non-volatile which can be of the same types as discussed above in relation to FIG. 4), at least one wireless communication interface (including RF equipment such as transceiver and antenna) 504. The wireless interface is arranged to communicate with a radio protocol compatible with SAE/LTE or similar using similar encryption of radio resource control messages; the wireless interface may be using fixed radio standards or a software defined radio solution. The UE may comprise other units and components as understood by the skilled person. The processing unit may for instance comprise at least one of a microprocessor, FPGA (Field programmable gate array), digital signal processor (DSP), or ASIC (application specific integrated circuit). The UE maintains state transition counter, hand-over counter and counter overflow events.

Similarly the CN maintains a counter for station transition events. This counter may be located in any suitable location such as in an HLR or VLR, or a support node depending on network configuration.

Values from the counters are distributed to the other parts of the RRC processes where it is needed depending on event in order to be used as input values in the key generation of the RRC process. This ensures synchronization between dependent entities of the network configuration such as between the UE and the eNodeB or the UE and the CN. In the ciphering mechanism in the RRC process there are inputs for several counter values in order to receive the appropriate counter values needed for synchronization and ciphering of the control messages.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

Abbreviations and Definitions
aGWs Access Gateways
AKA Authentication and Key Agreement
CN Core network
GGSN Gateway GPRS support node
GPRS General packet radio service
HFN Hyperframe number
HLR Home location register
IP Internet Protocol
LTE Long term evolution
MME Mobility management entity
MSC Mobility switching centre
NAS Non Access Stratum
RAN Radio access network
RRC Radio Resource control
SGSN Serving GPRS support node
UE User equipment
UPE User plane entity
VLR Visitor location register

The invention claimed is:

1. A. method for encrypting radio resource control (RRC) messages exchanged between a node (eNB) and a user equipment (UE) in a telecommunication system by using RRC keys for encryption of RRC messages, the method comprising separating sequence number rollover events from mobility events in the process of encryption of RRC messages, wherein separating sequence number rollover events from mobility events comprises:
   performing encryption of control messages related to state transitions in user equipment and a core network; and
   performing encryption of control messages related to handover events in the user equipment and in a radio access network part of the communications network, wherein the two encryption processes are separate from each other.

2. The method according to claim 1, wherein the step of separating comprise the steps of:
utilizing three different counters, which counters are hierarchical, such that when the first counter is incremented due to the occurrence of a first group of events the second and third counters are re-set to zero, and when the second counter is incremented due to a second group of events the third counter is reset to zero; and
providing the output from said counters as input to a crypto algorithm for encryption of RRC messages.

3. The method according to claim 2, wherein the first counter is a state transition counter, the second counter is a handover counter and the third counter is an overflow counter (HFN).

4. The method according to claim 1, wherein a crypto algorithm is used for producing an RRC key.

5. A user equipment (UE) in a telecommunications network, comprising a processing unit, a memory unit and at least one wireless communication interface wherein the processing unit is arranged to operatively exchange encrypted radio resource control (RRC) messages with a node (eNB) and/or a core network part in the telecommunications network by using, RRC keys for encrypting RRC messages, wherein the UE is arranged to separate sequence number rollover events from mobility events in a process for encrypting RRC messages and wherein separating sequence number rollover events from mobility events comprises:
performing encryption of control messages related to state transitions in user equipment and a core network; and
performing encryption of control messages related to handover events in the user equipment and in a radio access network part of the communications network, wherein the two encryption processes are separate from each other.

6. The user equipment according to claim 5, wherein the user equipment is provided with access to three different counters, which counters are hierarchical, such that when the first counter is incremented due to the occurrence of a first group of events the second and third counters are re-set to zero, and when the second counter is incremented due to a second group of events the third counter is re-set to zero, the user equipment is arranged to operatively provide the output from said counters as input, to a crypto algorithm for encryption of RRC messages.

7. The user equipment according to claim 5, wherein a crypto algorithm is used for producing the RRC key.

8. The user equipment (UE) according to claim 5, wherein the first counter is a state transition counter, the second counter is a handover counter and the third counter is an overflow counter (HFN).

9. A communication device in an infrastructure part of a wireless communication network, comprising a processing unit a memory unit, and at least one communication interface, wherein the processing unit is arranged to operatively exchange encrypted radio resource control (RRC) messages with other nodes in the telecommunications network by using RRC keys for encrypting RRC messages, wherein the device is arranged to separate sequence number rollover events from mobility events in a process for encrypting RRC messages, and wherein separating sequence number rollover events from mobility events comprises:
performing encryption of control messages related to state transitions in user equipment and a core network; and
performing encryption of control messages related to handover events in the user equipment and in a radio access network part of the communications network, wherein the two encryption processes are separate from each other.

10. The device according to claim 9, further arranged to maintain at least one counter stored in the memory unit for use in securing RRC messages characterized in that the device is further arranged to obtain three separated counters which are used in a hierarchical manner such that when the first counter is incremented due to the occurrence of a first group of events the second and third counters are re-set to zero, and when the second counter is incremented due to a second group of events the third counter is re-set to zero; the communication device is arranged to operatively provide the output from said counters as input to a crypto algorithm for encryption of RRC messages.

11. The device according to claim 9, wherein a crypto algorithm is used for producing the RRC key.

12. A system for handling communication in a wireless telecommunications network, comprising:
an access gateway (eNodeB); and
a core network; wherein the access gateway is arranged to communicate with a user equipment and the core network and wherein the access gateway is arranged to operatively exchange encrypted radio resource control (RRC) messages with other nodes in the telecommunications network by using RRC keys for encrypting RRC messages, wherein the device is arranged to separate sequence number rollover events from mobility events in a process for encrypting RRC messages, wherein separating sequence number rollover events from mobility events comprises:
performing encryption of control messages related to state transitions in user equipment and a core network; and
performing encryption of control messages related to handover events in the user equipment and in a radio access network part of the communications network wherein the two encryption processes are separate from each other.

13. The system according to claim 12, wherein the eNodeB is arranged to access three different counters, which counters are hierarchical, such that when the first counter is incremented due to the occurrence of a first group of events the second and third counters are re-set to zero, and when the second counter is incremented due to a second group of events the third counter is re-set to zero, and wherein each of the core network and access gateway are arranged to use the counters for producing radio resource control keys used in a crypto algorithm.

14. The user equipment according to claim 12, wherein a crypto algorithm is used for producing the RRC key.

15. A computer software product, comprising instructions stored in a non-transitory computer readable medium for use in a device part of a wireless telecommunication network, wherein the instructions are operable when executed, to instruct a processor to:
encrypt radio resource control messages (RRC), using encryption RRC keys, between user equipment, access gateway, and core network devices;
utilize three different counters, which counters are hierarchical, such that when the first counter is incremented due to the occurrence of a first group of events the second and third counters are re-set to zero, and when the second counter is incremented due to a second group of events the third counter is re-set to zero;
provide the output from said counters as input to a crypto algorithm for encryption of RRC messages; and optionally exchange counter values with other devices in the communication network.

\* \* \* \* \*

UNITED STATES PATENT AND TRADEMARK OFFICE
CERTIFICATE OF CORRECTION

PATENT NO. : 8,442,233 B2  
APPLICATION NO. : 12/513312  
DATED : May 14, 2013  
INVENTOR(S) : Mildh Page 1 of 1

It is certified that error appears in the above-identified patent and that said Letters Patent is hereby corrected as shown below:

In the Claims

In Column 8, Line 53, in Claim 1, delete "A." and insert -- A --, therefor.

In Column 9, Line 11, in Claim 3, delete "according:" and insert -- according --, therefor.

In Column 9, Line 24, in Claim 5, delete "using," and insert -- using --, therefor.

In Column 9, Line 27, in Claim 5, delete "messages" and insert -- messages, --, therefor.

In Column 9, Line 45, in Claim 6, delete "input," and insert -- input --, therefor.

In Column 9, Line 54, in Claim 9, delete "network ," and insert -- network, --, therefor.

In Column 9, Line 55, in Claim 9, delete "unit" and insert -- unit, --, therefor.

In Column 10, Line 37, in Claim 12, delete "network" and insert -- network, --, therefor.

In Column 10, Line 55, in Claim 15, delete "operable" and insert -- operable, --, therefor.

Signed and Sealed this  
First Day of October, 2013

Teresa Stanek Rea  
*Deputy Director of the United States Patent and Trademark Office*